No. 643,418. Patented Feb. 13, 1900.
T. B. LAMBERT.
PHONOGRAPH.
(Application filed May 8, 1899.)
(No Model.) 3 Sheets—Sheet 1.
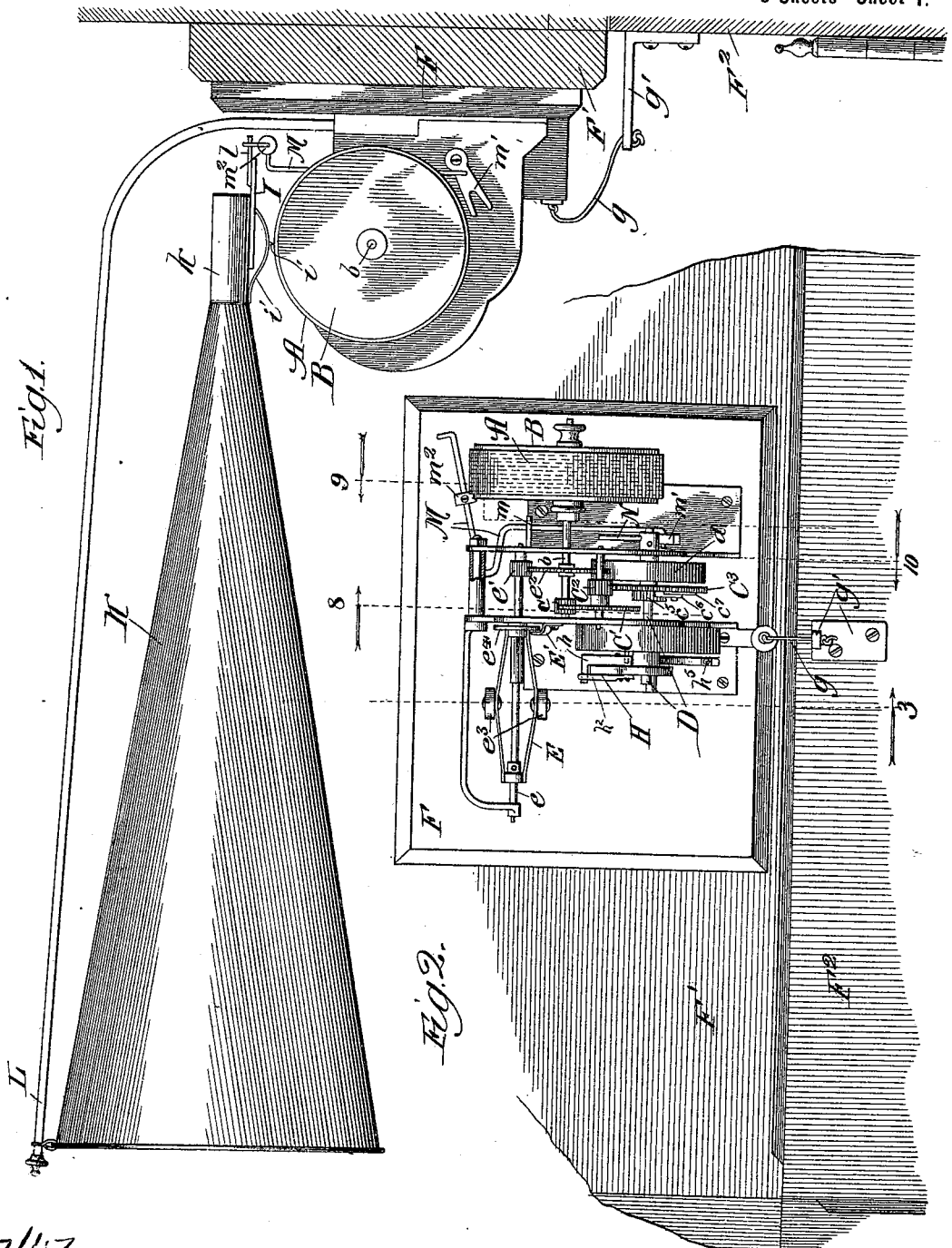

No. 643,418. Patented Feb. 13, 1900.
T. B. LAMBERT.
PHONOGRAPH.
(Application filed May 8, 1899.)
(No Model.) 3 Sheets—Sheet 2.
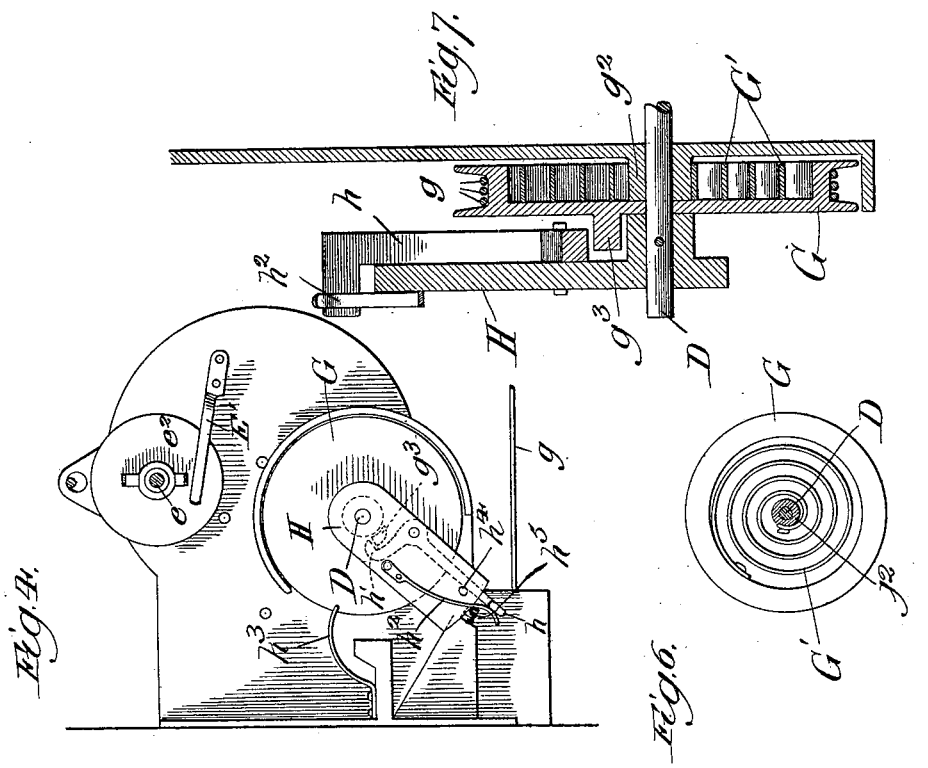
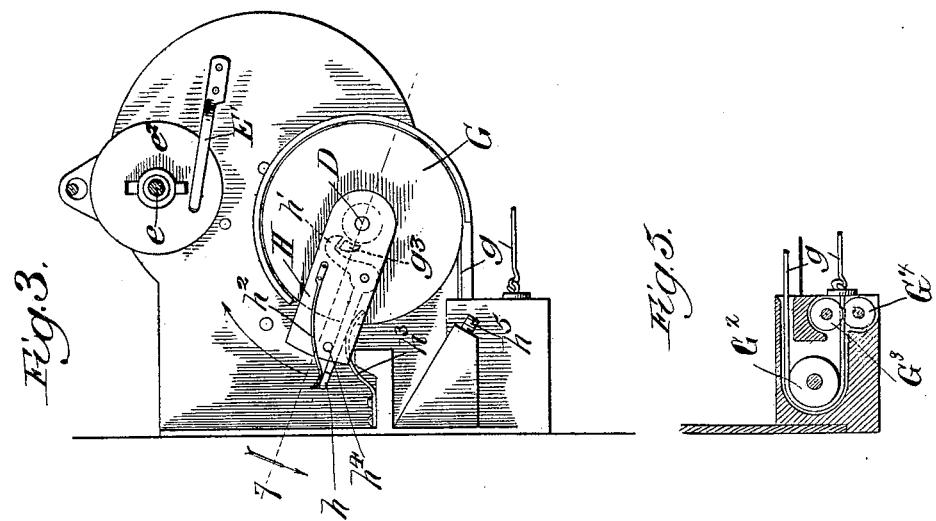
Witnesses: Inventor:
Thomas B. Lambert, No. 643,418. Patented Feb. 13, 1900.
T. B. LAMBERT.
PHONOGRAPH.
(Application filed May 8, 1899.)
(No Model.) 3 Sheets—Sheet 3.
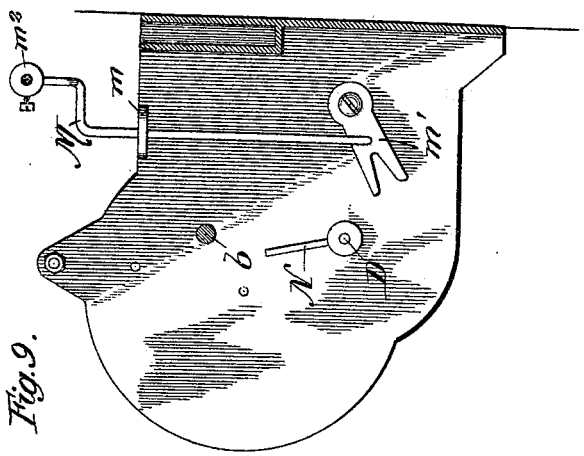
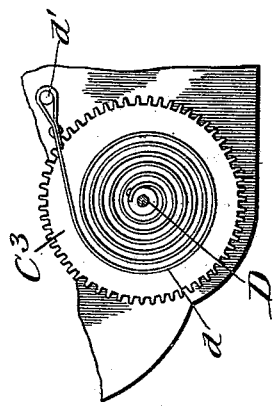
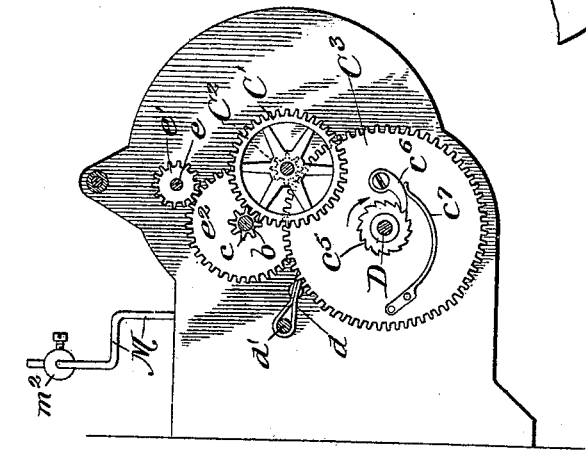
Witnesses:
Chas E Gaylord,
Luto S Peter
Inventor:
Thomas B. Lambert,
By Banning & Banning & Sheridan,
Attys

UNITED STATES PATENT OFFICE.

THOMAS B. LAMBERT, OF CHICAGO, ILLINOIS, ASSIGNOR, BY DIRECT AND MESNE ASSIGNMENTS, TO BRIAN F. PHILPOT, HENRY J. COSGROVE, ORSON C. WELLS, ROBERT PRINGLE, AND ALBERT D. PHILPOT, OF SAME PLACE.

PHONOGRAPH.

SPECIFICATION forming part of Letters Patent No. 643,418, dated February 13, 1900.

Application filed May 8, 1899. Serial No. 715,964. (No model.)

*To all whom it may concern:*

Be it known that I, THOMAS B. LAMBERT, a citizen of the United States, residing at Chicago, in the county of Cook and State of Illinois, have invented certain new and useful Improvements in Phonographs, of which the following is a specification.

My invention relates particularly to that class of phonographs arranged to be operated automatically, and especially to the means by which the operating mechanism is energized, all of which will more fully hereinafter appear.

The principal object of my invention is to provide a phonograph with simple, economical, and efficient mechanism for operating it automatically and for predetermined lengths of time; and the invention consists in the features, combinations, and details of construction hereinafter described and claimed.

In the accompanying drawings, Figure 1 is a side elevation of a phonograph constructed in accordance with my improvements and arranged to have its mechanism energized by the opening of a door. Fig. 2 is a front elevation of the same with the horn and case removed. Fig. 3 is an enlarged side elevation of the mechanism, partly in section and taken on the line 3 of Fig. 2, looking in the direction of the arrow; Fig. 4, a similar view showing the mechanism as it appears when energized; Fig. 5, an enlarged sectional detail; Fig. 6, a side elevation of the spring and its barrel, which are shown in sectional view in Fig. 7, looking at it from the inside; Fig. 7, an enlarged sectional view taken on the line 7 of Fig. 3. Figs. 8 and 9, respectively, are vertical sectional elevations taken on the lines 8 and 9 of Fig. 2; and Fig. 10, a sectional detail showing the mainspring, taken on the line 10 of Fig. 2, looking in the direction of the arrow.

It is well known in the art to which this invention relates that it is quite common and customary to run the record-cylinders of phonographs by motors of all kinds, and particularly with spring-motors which run for a given length of time and which when the energy stored therein is exhausted cease to operate the mechanism. It is desirable in this art, however, to use this class of phonographs for the purpose of advertising or uttering some well-known phrase, song, or piece of music repeatedly and to construct and arrange the mechanism in such a manner that the opening or closing of a door, pulling out of a handle, or other means will serve to energize the motor automatically and cause the parts to operate.

My invention, therefore, is designed, primarily, to provide a phonograph with actuating or automatically-operating mechanism so arranged and constructed that it can be wound up or energized by the opening or closing of a door, so as to cause the record-cylinder to operate and utter any phrase, piece of music, or advertisement that it is desirable to use, all of which will more fully hereinafter appear.

In constructing a phonograph in accordance with my improvements I provide a record-cylinder A of the desired size and shape and arranged to be supported on a drum B, which is formed of two flanged heads or disks mounted upon a shaft $b$. This shaft is arranged to be rotated by the train of gears and pinions C, C', $C^2$, and $C^3$, the last of which is loosely mounted upon a shaft D, to which shaft is secured one end of a spiral spring $d$, resembling the mainspring of a clock, the other end of which is secured to the frame of the machine at $d'$. The parts are so constructed and arranged that when the spring is at liberty to work or is wound up the train of gears and pinions are operated and the record caused to rotate.

To regulate the speed at which the train of gears operates, a centrifugal governor E is provided mounted upon a shaft $e$, which by means of the pinion $e'$ engages with a gear $e^2$ on the record-shaft, so that when such shaft is rotating the centrifugal governor is operated to throw its weights $e^3$ over from the center and as a consequence draw the disk $e^4$ outwardly against the frictional tension of the spring E', all of which serves to regulate the speed at which the train of gears operates.

As shown in Fig. 1, the phonograph is mounted upon a base F, which in turn is secured to a frame F' above, say, a door F². It is desirable to arrange the mechanism in such manner that when the door is opened the mainspring $d$ will be wound up and the mechanism caused to operate. In order to accomplish this result, a sheave-pulley G is provided and loosely mounted around the mainspring-shaft. This pulley is connected with the door by means of a cord $g$, which is wound around the pulley and passed between the idlers $G^2$, $G^3$, and $G^4$ and which is connected to the bracket $g'$ on the door, as appears in Figs. 1 and 2. The sheave-pulley is hollowed out on the inside, so as to receive a spiral spring G', which is secured thereto and to a boss $g^2$ on the frame of the machine, so that the movement of the door in opening acts to wind up the spring and produce a resistance that will, with the releasing or closing of the door, cause a reverse action on the sheave-pulley through the recoil of the spring and rotate such pulley backward and rewind the cord thereon. I prefer to use a coiled spring for this purpose rather than a weight, because the spring responds more promptly, keeping the cord taut and free from entanglement with the door when rapidly closed.

To impart the rotations of the sheave-pulley to the mainspring-shaft for the purpose of winding the same, the mainspring-shaft is provided with a lever-arm H, having a dog $h$ pivotally mounted thereon, so that the latch portion $h'$ may be contacted by a lug $g^3$ on the sheave-pulley. When the parts are in the position shown in Fig. 3, a spring $h^3$, arranged on the frame or other fixed part of the machine, serves to keep the dog in position against the tendency of a second or emergency releasing-spring $h^2$ until the dog is contacted by a lug $g^3$ on the sheave-pulley, which position is regulated by means of the pin $h^4$. When the sheave-pulley starts to rotate, the lug $g^3$ contacts the hook of the dog and by means of its engaging friction carries the dog, lever-arm, and mainspring-shaft around until the parts reach the position shown in Fig. 4, so that the end of the dog is contacted by the stop-screw $h^5$, the engaging friction overcome, and the dog pushed over as the sheave continues to rotate until the latch is disengaged from the lug thereon. This point is reached when the mainspring is completely wound up or wound up sufficiently to cause the record to operate the desired or predetermined length of time. If the door is opened farther, it will be seen that the sheave-pulley is rotated without in any way injuring the mechanism or causing the mainspring to be wound too tight. The spring $h^3$ also holds the latch $h'$ in position to be engaged by the lug $g^3$ with the forward travel of the sheave-pulley, as without such spring the tendency of the engagement would be to throw the dog down and carry the latch out of the path of travel of the lug.

From an inspection of Figs. 3 and 4 it will be seen that if the door is opened only partially and then quickly closed before it completely winds the spring, so as to cause it to contact or impinge against the stop-screw, the second or emergency releasing-spring $h^2$ will force the dog from and out of contact with the lug on the sheave-pulley, and thereby permit the independent opening and closing of the door without winding the spring to its limit and as required to bring the parts into the proper relation hereinafter described for operating the horn and diaphragm, which, as will be seen, provides safety mechanism, so that the phonograph will perform its operations entirely or not at all, and also permits the cord to be retained in a taut condition and prevented from being caught by the closing door. The engagement between the lug and latch from the starting-point until the pin $h^5$ is reached will be maintained so long as a steady pull of the cord on the pulley is continued. Any release of the pull, however, will permit the cord to slack, when the spring $h^2$ at once acts and breaks the engagement between the lug and the latch, so that any partial opening and quick closing of the door slacks the cord and releases the engagement.

It is desirable to so construct the mechanism that when the mainspring is being wound up the train of gears will not be operated. In order to accomplish this result, the gear-wheel $C^3$ is loosely mounted on the mainspring-shaft and the mainspring-shaft provided with a ratchet $c^5$, rigidly fixed thereto. The gear-wheel is provided with a pawl $c^6$, engaging with the ratchet and held yieldingly in such engagement by the tension-spring $c^7$. It will thus be seen from an examination of Fig. 8 that as the mainspring is being wound during the rotation of the ratchet in the direction of the arrow the pawl passes over the teeth of the same; but when the mainspring is released the ratchet engages with the pawl and causes the train of gears and pinions to be operated.

The releasing of the door leaves the parts in position to be operated, so that the mainspring causes the train of gears and pinions to operate and the record to rotate. It is now desirable that the record shall be used for the purpose of vibrating a diaphragm or similar element in such manner as to cause sound-vibrations of the atmosphere, so as to utter well-known phrases or pieces of music. In order to accomplish this result, a diaphragm I is provided and a stylus $i$ secured thereto by means of a spring $i'$. Secured to this diaphragm in any desired manner and preferably so as to form a portion of the small tubular part $k$ thereof is a horn K, so arranged that when the diaphragm is vibrated the vibrations cause sound-waves of the atmosphere to be transmitted through the large end of the horn and utter the desired sounds.

The stylus is so arranged that when the mainspring is wound up it engages with the spiral groove in the record at the left side of Fig. 2, and as the record rotates the stylus is moved and carries the inner end of the horn with it toward the right.

When the record has been discharged, it is desirable that the parts be returned to their normal or original position at the left of the record and in position to engage with the spiral groove thereof. In order to accomplish this result, the front end of the horn is loosely supported by a rod L, and the diaphragm is provided with a pin $l$, arranged above a bent rod M, which is slidingly mounted in a bracket $m$ on the frame and secured to a vibratable lever $m'$, which is pivotally mounted on the frame. This lever is bifurcated and arranged in the path of a stud or pin N, which is secured to the mainspring-shaft, so that as the shaft rotates and when the mainspring is wound up this pin enters the bifurcation or slot of the vibratable lever and causes the same to be raised, raising thereby the bent rod, which in turn contacts the pin $l$ on the diaphragm, raising the stylus out of the groove. As will be seen by looking at Fig. 2, the upper portion of this rod is arranged in an inclined plane, so that the moment the stylus is raised above the record-cylinder the diaphragm and horn may slide down the inclined plane of the bent rod until it contacts the collar or stop $m^2$. When this stop is reached, the vibratable lever is lowered and the stylus permitted to enter the record-groove and cause the same to discharge the record and again cause sound-vibrations of the atmosphere. The return of the stylus to its normal or starting position in relation to the record depends on the lifting of the carrying-rod, and the movement of such rod depends on the raising of the vibratory lever, which in turn depends on the winding of the power-spring to its full limit, and such winding of the power-spring can only be had with the limit of throw or movement forward of the shaft-arm H, so that each part performs its office or function contingent on the performance by the other parts of their office or function.

It will thus be seen that the full throw or movement forward of the arm H is required in order to set the machine for use and that a partial throw or forward movement of such arm will not start the phonograph, because such partial throw or movement does not wind up the spring sufficiently for the vibratable lever to be raised and return the stylus, which remains at the terminus of its travel, and consequently out of use, so that while such partial movement of the arm would wind the power-spring and the spring would operate the gear such operation would not cause the phonograph to operate, as the stylus is in position where it is out of use. An initial throw or movement of the arm H sufficient to raise it out of contact with the spring $h^3$ and cause an engagement between the lug and dog would leave the spring $h^2$ free to act, and a quick stoppage of the door, so as to slack the operating-cord, would make the spring $h^2$ act and release the lug and dog, so that the door can be freely swung open without imparting rotation to the winding-shaft, thus enabling the device to be operated and permit the door to open and close without affecting the winding devices.

While I have described my invention with more or less minuteness as regards details of form and construction, I do not desire to be limited thereto unduly any more than is pointed out in the claims. On the contrary, I contemplate all proper changes in form, construction, and arrangement, the omission of immaterial elements, and the substitution of equivalents as circumstances may suggest or necessity render expedient.

I claim—

1. In a phonograph of the class described, the combination of a rotatable carrier supporting a record-cylinder, a train of gear for transmitting power and motion to such carrier, a main or driving shaft having a power-spring for rotating such shaft, a vibratable or oscillating pulley loosely mounted around the main shaft, a lever-arm connected with the main shaft and a make-and-break connection between the lever-arm and the pulley whereby the forward advance of the pulley connects the arm and pulley and drives the shaft to wind the power-spring and the limit of winding disconnects the lever-arm and pulley and permits them to rotate independently, substantially as described.

2. In a phonograph of the class described, the combination of a drum supporting a record-cylinder, a train of gearing for transmitting power and motion to the supporting-drum, a main shaft provided with a gear engaging the train of gear and with a power-spring for rotating such main shaft, a vibratable or oscillating pulley loosely mounted around the main shaft and having a cord extending to and connected with a movable object, a lever rigidly secured to the main shaft so as to rotate such shaft and a spring-and-dog mechanism mounted upon the lever and adapted to be engaged by the pulley as it is advanced in a forward direction and wind the spring and to be disengaged from the pulley as the spring reaches the limit of winding for the pulley to return independently of the arm to its initial position, substantially as described.

3. In a phonograph of the class described, the combination of a drum supporting a record-cylinder, a train of gear for rotating the drum, a main shaft provided with a gear engaging the train of gear and with a power-spring for driving such shaft, a vibratable or oscillating pulley loosely mounted around the main shaft and provided with a projecting lug, a lever-arm rigidly connected with the main shaft, a dog pivotally mounted on the lever-arm and arranged to be engaged by the lug on the pulley as it rotates in one direction, a stop on the lever-arm to limit the movement of the dog in one direction and spring mechanism for throwing the dog into and out of engagement with the lug on the pulley, substantially as described.

4. In a phonograph of the class described, the combination of a drum supporting a record-cylinder, a train of gears and pinions for rotating the drum, a mainspring-shaft provided with a gear engaging with the train of gears and pinions and with a mainspring secured to some fixed or rigid portion of the machine, a pulley loosely and independently mounted around the mainspring-shaft and provided with a projecting lug, a lever-arm rigidly connected with the mainspring-shaft, a dog pivotally mounted on the lever-arm and arranged to be engaged by the lug on the sheave-pulley as it rotates in one direction, a stop on the lever-arm to limit the movements of the dog in one direction, spring mechanism for throwing the dog into and out of engagement with the lug on the sheave-pulley and a stop secured to some fixed portion of the machine and in the path of the dog so that the dog may contact the same when the spring is wound up and be disengaged from the sheave-pulley, substantially as described.

5. In a phonograph of the class described, the combination of a drum supporting a record, a train of gear for transmitting power and motion to the drum, a main shaft engaging with the train of gear and provided with a power-spring for imparting rotation to the shaft, a releasable and self-returnable vibratable or oscillating pulley loosely mounted on the main shaft, a cord secured to the pulley and to some movable body, a coiled spring for the pulley operating to rewind the cord when the pulley is released and a make-and-break connection between the main shaft and pulley operating to connect the two when the pulley is moved in a forward direction and to disconnect them and permit each to rotate independent of the other when the limit of the forward movement is reached, substantially as described.

6. In a phonograph of the class described, the combination of means for supporting a record, a train of gear for transmitting power and motion to the record-supporting means, a main shaft connected with the train of gear, a power-spring for rotating such shaft, a diaphragm provided with a stylus arranged to engage the record and cause sound-vibrations of the diaphragm and means operated by the forward rotation of the main or power shaft in winding the power-spring at the completion of the winding to raise the stylus clear of the record and cause it to return to its initial position for reëngagement with the record, substantially as described.

7. In a phonograph of the class described, the combination of means for supporting and rotating a record, a mainspring-shaft provided with a mainspring for transmitting power and motion to the record-supporting means, a diaphragm and stylus arranged to engage with the record and cause sound-vibrations of the atmosphere, a rod having an inclined upper portion adapted to contact the diaphragm and be raised and lowered by the movements of the mainspring-shaft so as to raise the diaphragm and permit it to slide down to its initial position where it can reengage the record then drop out of the way and permit the record to operate the stylus, substantially as described.

8. In a phonograph of the class described, the combination of a drum supporting a record-cylinder, a mainspring-shaft provided with a mainspring for transmitting power and motion to the record-drum, a diaphragm and stylus arranged to be engaged by the record and cause sound-vibrations of the diaphragm, a vibratable lever arranged to be operated by the movements of the mainspring-shaft, a rod connected with such vibratable lever and having an inclined upper portion adapted to contact the diaphragm lift it out of the record and permit it to slide down to its initial position, substantially as described.

9. In a phonograph of the class described, the combination of a drum supporting a record, a mainspring-shaft for transmitting power and motion to the record-drum, a diaphragm and horn connected in one continuous piece and provided with a stylus adapted to engage with the record and cause sound-vibrations, a projection on the diaphragm, a vibratable lever pivotally secured to a fixed portion of the machine and arranged to be vibrated by the movements of the mainspring-shaft, a rod secured to the vibratable lever and having an inclined upper portion adapted to contact the projection on the diaphragm raise it out of connection with the record permit it to slide down to its initial position where it can reëngage the record, then drop out of the way and permit the record to operate the diaphragm, and an adjustable stop on the rod to regulate the reëngagement of the stylus and record, substantially as described.

10. In a phonograph of the class described, the combination of a drum supporting a record, a mainspring-shaft for transmitting power and motion to the record-drum, a diaphragm and horn connected in one continuous piece and provided with a stylus adapted to engage with the record and cause sound-vibrations, a projection on the diaphragm, a vibratable lever pivotally secured to a fixed portion of the machine and arranged to be vibrated by the movements of the mainspring-shaft, a rod secured to the vibratable lever and having an inclined upper portion adapted to contact the projection on the diaphragm, raise it out of connection with the record, permit it to slide down to its initial position where it can reëngage the record, then drop out of the way and permit the record to vibrate the diaphragm, an adjustable stop on the rod to regulate the position or reëngagement of the stylus and record, and a rod extending out over the large end of the horn to which the large end of the horn is loosely secured, substantially as described.

THOMAS B. LAMBERT.

Witnesses:
  THOMAS F. SHERIDAN,
  THOMAS B. MCGREGOR.